(12) United States Patent
Michael (10) Patent No.: US 6,442,846 B1
(45) Date of Patent: Sep. 3, 2002

(54) MOTORIZED ROTATING FORK WITH AUTOMATIC STOP

(76) Inventor: Maiello Michael, 4939 Juanita Way South, St. Petersburg, FL (US) 33705

( * ) Notice: Subject to any disclaimer, the term of this patent is extended or adjusted under 35 U.S.C. 154(b) by 0 days.

(21) Appl. No.: 09/699,516

(22) Filed: Oct. 31, 2000

(51) Int. Cl.[7] ................................................. A47J 43/28
(52) U.S. Cl. ................................................. 30/322
(58) Field of Search .......................... 30/322, 323, 324, 30/142, 137

(56) References Cited

U.S. PATENT DOCUMENTS

| | | | |
|---|---|---|---|
| 2,602,996 A | 7/1952 | Piche | 30/322 |
| 2,710,449 A | 6/1955 | Crino | 30/322 |
| 2,748,479 A | 6/1956 | Levine | 30/323 |
| 2,841,869 A | 7/1958 | Levine | 30/322 |
| 3,552,017 A | 1/1971 | Smuts | 30/322 |
| 3,589,009 A | 6/1971 | Miscavich et al. | 30/322 |
| 3,742,840 A | 7/1973 | Cogswell | 99/421 A |
| 4,211,372 A | 7/1980 | Zapomel | 242/1 |
| 5,005,293 A | 4/1991 | Di Amico | 30/322 |
| 5,062,211 A | 11/1991 | Di Amico | 30/322 |
| 5,119,563 A | 6/1992 | Willner, Jr. | 30/322 |
| 5,421,089 A * | 6/1995 | Dubus et al. | 30/322 X |

FOREIGN PATENT DOCUMENTS

FR 2541571 8/1984

* cited by examiner

Primary Examiner—Douglas D. Watts
(74) Attorney, Agent, or Firm—Banner & Witcoff, Ltd.

(57) ABSTRACT

A rechargeable electric motorized pasta fork has an automatic stop mechanism for stopping the rotation of a two-part fork assembly after preset number of revolutions or after a user controlled number of revelations by engagement of a switch. The fork assembly includes a stationary fork element and a rotating inner fork element. The pasta fork also includes a handle that houses a gearing mechanism, which cooperates with a motor.

20 Claims, 5 Drawing Sheets

MOTORIZED ROTATING FORK WITH AUTOMATIC STOP

FIELD OF INVENTION

The present invention relates to culinary devices and more specifically to a motorized fork having the capability to controllably spin and stop, in one hand of the user for the accumulation of a stringy food product.

BACKGROUND OF THE INVENTION

Conventionally, it has been the practice to eat spaghetti or other types of stringy food with a fork placed in the hand of a user where the hand is turned or twisted to accumulate a food product onto the tines of a conventional fork. Once the accumulation of the food has been achieved, the fork is then lifted and the food is consumed from a collected position on the end of the fork. The conventional fork consists of a lower end having tines and a handle that is held by the user. There are no separate or removable parts, or any movement between the parts, the only spinning motion is accomplished by manipulation by the user.

In the culinary art, there have been several attempts made to employ a spinning arrangement for fork tines. U.S. Pat. No. 2,841,869 to Levine and U.S. Pat. No. 2,602,996 to Piche disclose manually operated spaghetti forks that appear to eliminate the wrist motion to twist the fork. These designs appear to cause problems and difficulties by requiring the user to employ great manual dexterity or to employ fingers to accomplish the spinning motion and subsequent stoppage of the tines. The spinning provisions of these forks had to be held in place manually and then locked in place relative to the handle before lifting the food from the plate. Thus, use of the aforementioned designs required either a great deal of patience or unrealistic manual dexterity with one hand operation.

These problems lead to the development of motorized pasta forks. One such example is U.S. Pat. No. 5,062,211 to Di Amico which discloses the use of a motor and gearing to drive tines integrally connected to a rotatable shaft in a twisting motion. The tines are not removable from the handle and can present a difficulty cleaning the fork. Also, a push-button switch appears to start and stop the rotation of the tines, however, the user is left to determine when to stop the rotation. This may be caused in part because the tines end up out of position. Thus, the user may be left with unmanageable pasta strings hanging from the end of the tines as it is raised from the plate to be consumed. There is no provision for automatically stopping the twisting motion of the tines.

U.S. Pat. No. 3,589,009 to Miscavich et al. discloses a spaghetti fork having a motor, a handle, and a removable rotating fork. The entire fork rotates and accululates spaghetti without a guide or other containment. The fork stops rotating when a switch is released. Thus, this device also relies on manual actuation to stop accumulation, and users may have difficulty gathering a neat ball of spaghetti because they cannot stop the fork from rotating in a timely manner or the tines may be out of position. The elderly and persons lacking manual dexterity may have difficulty in using the above devices.

There is a need for a motorized culinary device that provides for automatic stoppage of a spinning fork's motion. There is also a need for a rotating fork which regulates the amount of food collected on the tines by provision of a guide. Thus, creating a substantially neat ball of stringy food without messy strings. There is also a need for a motorized culinary device that provides for a user to set a predetermined number of rotations of a rotating fork.

SUMMARY OF THE INVENTION

The present invention is directed to a culinary device having an automatically controlled stop system and a multiple part fork assembly that overcomes the problems in the prior art.

One aspect of the present invention includes a hand held culinary device for consumption of a stringy food product. The device includes a handle body having a free end and a tool end. A motor disposed inside of the handle body engages a gearing system. The motor is actuated by a switch activated by a user. In this manner, the fork receives rotary motion from the gearing system, via a drive shaft. An automatic stop system is provided for terminating the rotary motion of the fork, after a predetermined number of revolutions after the switch is actuated or at predetermined position with respect to the tool end.

In another aspect of the invention, the fork assembly on the tool end of the handle includes a fork assembly comprising a stationary member and a rotating member. The rotating member rotates relative to the stationary member about a longitudinal axis of the handle body. The stationary member acts as a guide to regulate the amount of pasta collected on the rotating member.

In a third aspect of the present invention, a pasta fork has a bi-planar fork assembly for accumulation of a food product. The fork assembly includes a stationary plane and an inner rotating plane formed by the fork components. A stopping system generally stops the inner rotating plane substantially coincident with the stationary plane. This provides the user with a substantially uniform eating surface once the food product is accumulated.

In a fourth aspect of the present invention, a fork assembly comprises an outer fork and an inner fork. In one aspect, the outer fork has tines that are stationary with respect to the inner fork. The inner fork rotates within the tines of the outer fork. In another aspect, the outer fork is adapted to rotate substantially around the tines of the inner fork and the inner fork is stationary with respect to the rotatable outer fork.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

Referring to FIGS. 1–8, a culinary device for consuming string-like food, such as, pasta in accordance with the present invention is illustrated. The culinary device is generally referred to herein as a pasta fork and designated by reference numeral 10. Pasta fork 10 includes an elongated, hollow handle body 4 in the form of a sleeve having a tool end 11 and a free end 13. A removable fork assembly 30 of two parts accumulates food on thereon, the two parts including a fixed outer fork element 32, and a rotating inner fork element 36 inside of the outer fork element. Inner fork element 36 rotates about longitudinal axis 8 of pasta fork 10. Fork assembly 30 also includes an engaging mechanism 44 for insertion into tool end 11 of pasta fork 10.

Figure 1:
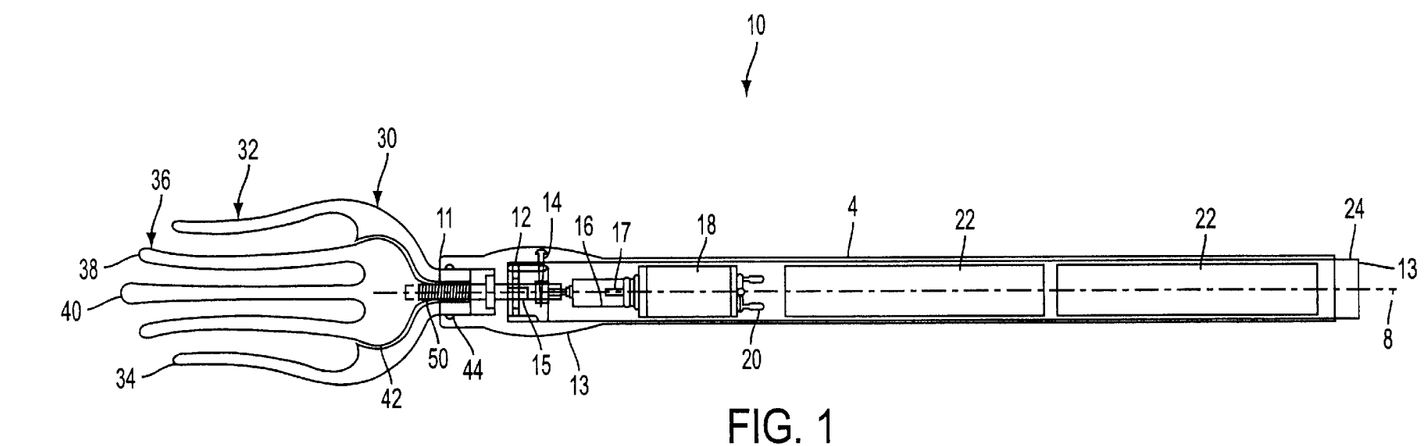
FIG. 1 is a schematic plan view of an embodiment of the culinary device of the present invention shown with a top surface broken away.

Pasta fork 10 also includes a stop mechanism or system 12 for stopping or terminating the rotation of inner fork element 36 after a predetermined number of revolutions or after a number of revolutions controlled by a user about axis 8. Stop system 12 also terminates the rotation of the inner fork element at a predetermined position with respect to outer fork element 32. A switch 14 initiates the rotation of inner fork element 36. A gearing mechanism or system 16 is operatively connected to an electric drive 18. A power source 22 provides electrical power to operate electric drive 18. Pasta fork 10 also includes a charging mechanism 24 to provide electric power and if desired, recharge power source 22 between uses. Alternatively, the power source can include conventional dry cell batteries, such as, AAA size rechargeable or non-rechargeable type.

As shown in FIGS. 1–4, fork assembly 30 includes inner fork element 36 disposed within the tines of outer fork element 32. A coupler shaft 51 retains inner fork element 36 to the fork assembly. Outer fork element 32 guides a food product to be accumulated onto the inner fork element 36 in a substantially neat fashion so as to avoid the mess of dangling food product during dining. Inner fork element 36 is spaced from the outer fork assembly 32 such that a narrow gap 42 is formed between fork elements 32 and 36. This gap 42 allows the inner fork element 36 to freely rotate within the outer fork element 32. In an alternative embodiment, the gap allows the outer fork element to rotate around the inner fork element. Also referring to FIG. 3, the profile of fork assembly 30 is somewhat spooned shaped to more easily gather the food product.

Fork assembly 30 and associated components can be constructed from a variety of materials normally used in the culinary art. Suitable materials that can be used include stainless steel, aluminum, and plastics.

Figure 2:
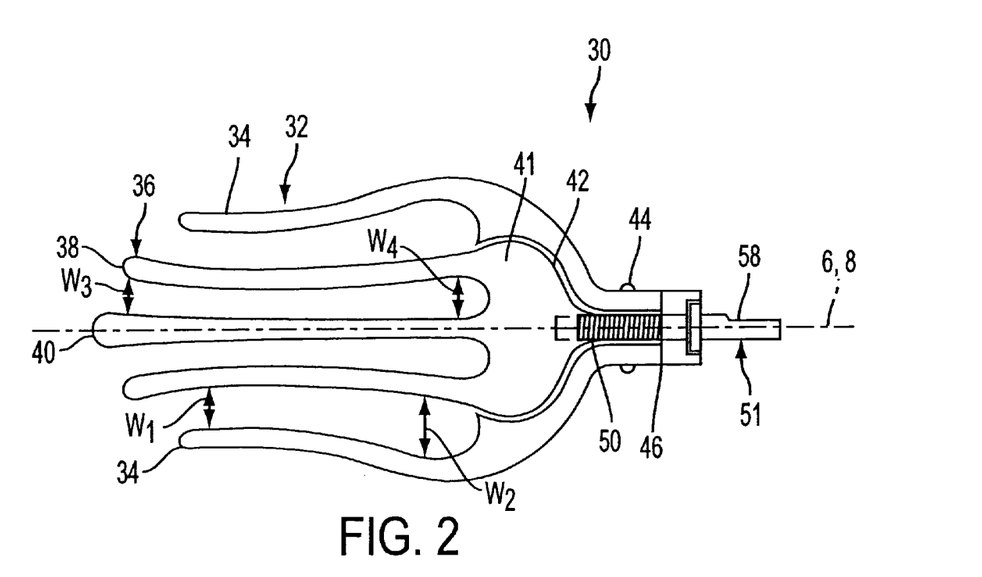
FIG. 2 is a plan view of a fork assembly according to the teachings of the present invention.
Figure 6:
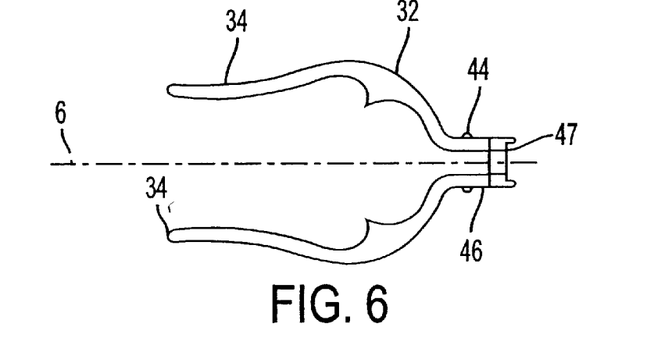
FIG. 6 is a plan view of an outer fork element of the present invention.

Referring to FIGS. 1, 2 and 6, outer fork element 32 includes a plurality of opposing laterally disposed outer tines 34 fixedly connected to a stem 46. In the illustrated arrangement the number of outer tines 34 includes two, but more tines may be used. A single outer tine is also a possibility with the inner tines disposed to one side. Outer fork element 32 also includes on stem 46 an engaging mechanism 44 that engages tool end 11 of the pasta fork 10 for retaining fork assembly 30 on the handle. Engaging mechanism 44 also allows fork assembly 30 to be removed from handle body 4 for such purposes, as cleaning or replacing an alternative tool assembly for different types of food products. For example, an alternative tool assembly can be a cutting tool that cuts like a mill. Engaging mechanism 44 includes a spring biased bearing ball that is biased to bear against an inner surface of tool end 11 when inserted thereto. Stem 46 includes a slightly elongated opening for insertion of a coupler portion 50 of inner fork element 36 therethrough. Further, stem 46 includes a stop 45 having a bearing surface 47 for abutting of an annular collar of coupler shaft 51.

Fork assembly 30 also includes inner fork element 36, which rotates to gather a long stringy food product. Inner fork element 36 includes a plurality of laterally disposed tines 38 and a central tine 40. In addition, tines 38 and central tine 40 are longer in overall length than outer tines 34 of outer fork element 32. Such, a longer central tine 40 advantageously provides a pivot like feature for inner fork element 36 to readily rotate without restriction when contacting an eating surface, such as a plate. Tines 38 and central tine 40 are connected to a base 41 of inner fork element 36. Inner fork element 36 also includes a coupler portion 50 having a cylindrical opening for receiving coupler shaft 51. The cylindrical opening includes a female screw type thread that interconnects with a threaded portion 52 of coupler shaft 51.

Coupler shaft 51 is disposed within the opening of inner fork element 36 for coupling and connecting to a drive shaft 15 within handle body 4. The connection of inner fork element 36 and coupler shaft 51 is best shown in FIG. 2, where the opening of stem 46 has two opposing ends, and coupling portion 50 of the inner fork element 36 is inserted into the opening in one end of stem 46. On the other end of stem 46, threaded portion 52 of coupler shaft 51 is inserted and twisted so to as to connect inner fork element 36 to outer fork element 32. Likewise, to separate inner fork element 36 from fork assembly 30, the user simply unscrews coupler shaft 51, thus allowing the assembly 30 to be washed or cleaned without having to immerse handle body 4 and the internal components in water.

Figure 4:
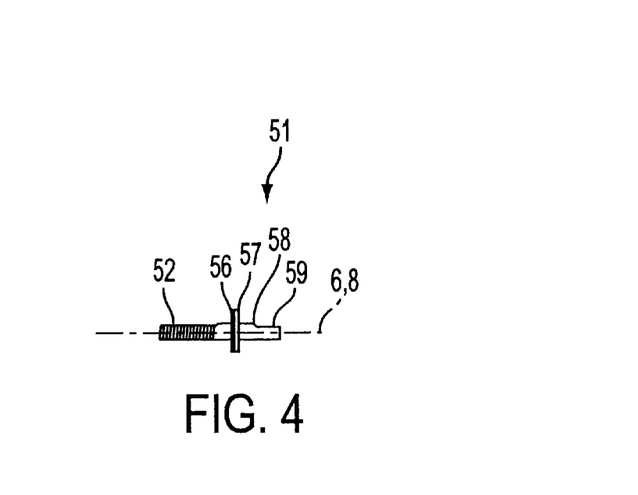
FIG. 4 is side view of a coupler shaft according to the present invention.

Referring to FIG. 4, coupler shaft 51 includes an integral annular collar 57 that mates within the bearing surface 47 on stem 46 of outer fork element 32. Bearing surface 56 is included on the coupler shaft 51 for abutting bearing surface 47. Bearing surface 56 embodies a low friction material that will readily enable rotatation within bearing cavity 47. Bearing surface 56 may be a removable item, such as, a washer sized to be mounted on coupler shaft 51. Suitable materials for bearing surface 56, include TEFLON® by Dupont Corporation or a metal covered with a lubricant. Coupler shaft 51 also includes a shaft portion 58 at the opposite end for engaging and connecting to drive shaft 15. Shaft portion 58 includes a notch 59 that mates with a complementary notch on drive shaft 15. The rotary motion of drive shaft 15 is transferred to coupler shaft 51, via shaft portion 58. The rotary motion of shaft portion 58 provides motion to inner fork element 36.

In operation, outer tines 34 of outer fork element 32 remain stationary as inner fork element 36 rotates. The multi-part fork assembly enables a desired amount of stringy food product to be gathered or wound for consumption, such as, pasta into a bite-size ball. Fork assembly 30 includes gathering wells for accumulation of food. The spacing ($w_2$) between a fixed outer tine 34 and the adjacent rotating inner tine 38 near the base of fork assembly 30 is greater than the spacing ($w_1$) between the same elements near the tip of the fork assembly. That is, the ratio of $w_2/w_1$ is greater than one.

This allows more pasta to be gathered or wound into a snug bite size ball with most of the pasta accumulating near the base of the fork assembly. As inner fork element 36 rotates and food product is gathered, fixed outer tines 38 provide a guiding obstruction to force the food product into the fork assembly towards base 41. Also, the narrower spacing of the inner and outer tines near the tip of fork assembly 30 creates a restriction or bottleneck that prevents the food product from slipping off easily.

Likewise, the spacing ($w_3$) between an inner tine 38 and central tine 40 near the tip is less than the spacing ($w_4$) between the same near the base of the fork assembly, i.e., the ratio of $w_4/w_3$ is greater than one. This also contributes to improved gathering and winding of a pasta food product and also creates a slight restriction to keep pasta from sliding off too easily once the inner rotating fork has been activated. After gathering the food, a neatly wound ball of spaghetti is placed into the mouth and removed gently between the lips and/or teeth of a user with minimal resistance.

Figure 3:
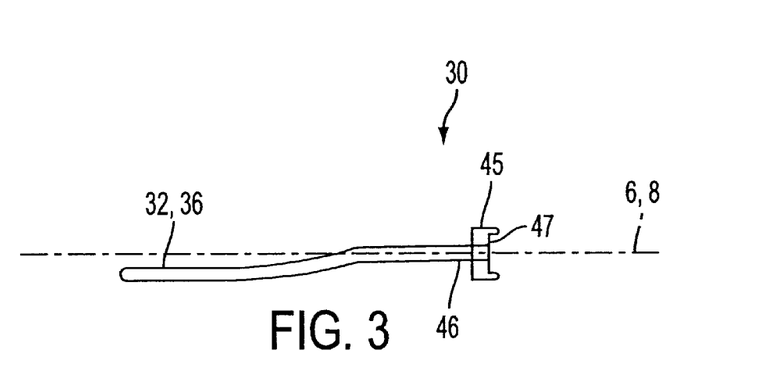
FIG. 3 is a side view of the fork assembly of FIG. 2.

It should be noted that inner fork element 36 includes a dual axial rotational effect that helps to gather the food product. Referring to FIGS. 2 and 3, inner fork element 36 includes base 41 and coupler portion 50 coincident with the longitudinal axis 8 of the handle body 4. Further, tines 38 and central tine 40 are offset from the axis 8 in the elevation as seen in FIG. 3. Thus, tines 38 and 40 rotate in an offset sweeping motion. In addition, fork assembly 30 can be thought of as creating a bi-planar rotational system. One plane of reference extends across the laterally disposed outer tines 34 of outer fork element 32 and is a stationary plane. A second plane of reference extends between tines 38 including central tine 40 of inner fork element 36 and is a rotating plane. When inner fork element 36 rotates, the rotating plane rotates relative to the stationary plane about an axis offset from axis 8.

Referring to FIG. 1, the pasta fork 10 includes stop system 12 disposed inside handle body 4. Stop system 12 may include a timer or a counter device operatively coupled with the control circuitry and the electric drive. The stop system is configured to terminate the rotation of the inner fork element 36 after a predetermined number of full revolutions or after a user determines the number of rotations from one to another number. A run period is herein defined as the amount of time or counts the electric drive operates from start to finish. One configuration of the stop system is illustrated as follows. If inner fork element 36 rotates at 30 revolutions per minute, this translates into one revolution per every two seconds; or equivalently stated as for every two seconds, there is one full rotation of the inner fork element. Therefore, during two rotations, the stop mechanism is configured for a run period of four seconds and during three rotations, the run period is six seconds and so forth. It is appreciated that specific combination of rotational speeds, number of rotations, and calculation of run periods depend on a number of factors. If desired, one skilled in the art may use an encoder and microprocessor arrangement to accomplish the above. The encoder may be optical or magnetic in which the number of rotations are digitally transmitted to the control circuitry including the microprocessor. Stop system 12 provides the user with selective control for the accumulation of the food product and reliably allows the food product to be gathered on the fork assembly 30. The user simply "dials in" or sets the desired number of rotations. One setting of number of rotation can be a preset default value. The number of predetermined revolutions is preferably three, but may range from two and five revolutions. If desired, the number of revolutions may depend on the texture and construction of the pasta. For example, the accumulation of thin spaghetti may need five revolutions rather than three. Stop system 12 prevents uncontrolled spinning and turning of inner fork element 36 once a sufficient amount of food product has been gathered. If desired, the user can determine any number of revolutions or rotations and control how long the inner fork element rotates.

In addition, stop system 12 preferably terminates the rotation of inner fork element 36 to align it laterally between outer tines 34 so that the stationary plane and rotating plane are coincident. In this locked arrangement, inner fork element 36 and outer fork element 32 substantially form a planar surface across fork assembly 30.

Switch 14 is actuated by the user to activate the rotation of the inner fork element 34 via electric drive 18. Switch 14 embodies a push-button type that contacts a control circuitry located within handle body 4. A liquid-tight membrane 13 for preventing liquids, such as water to enter and damage the internal components, covers switch 14 externally. Membrane 13 also provides a reliable hold area on handle body 4 near tool end 11 of the pasta fork, thus providing a comfortable gripping surface.

Electric drive 18 is configured with sufficient torque and rotational speed for imparting rotary motion to gearing mechanism 16 to rotate inner fork element 36. Electric drive 18 includes a small shaft 17 that couples with the gearing system 16 to rotate about axis 8 of the pasta fork 10. If desired, small shaft 17 may have a worm gear arrangement (not shown) for connection to the gearing system. Electric drive 18 is preferably an electric motor that draws power from power source 22, via leads 20. Electric drive 18 preferably operates with three volts of electric voltage potential and draws approximately 0.75 watts of power. The voltage, however, may vary depending on the type of motor selected. Electric drive 18 may have an exemplary ten-millimeter diameter or 0.3937 inches, the diameter may vary accordingly. One supplier of a motor for the electric drive is Maxon Precision Motors, Inc., a United States subsidiary of Maxon Motor AG of Switzerland.

Gearing system 16 includes a plurality of mechanical gears enabled to receive rotational motion and torque from electric drive 18. The gearing system engages drive shaft 15 and includes reduction to supply sufficient torque to inner fork element 36. An exemplary arrangement provides approximately 14.15 ozf-in (0.100 Newton-meters) of torque and a rotational speed of approximately 40 revolutions per minute (rpm) to the inner fork element. In one exemplary arrangement, gearing system 18 embodies a gearhead unit. The present invention is not limited to the aforementioned torque and rotational speed. If desired, the torque may range from 12 ozf-in(0.085 Nm) to 16 ozf-in (0.11 Nm) and speed may range from 30 to 60 rpm. Nevertheless, the specific combination of torque and speed may depend on the differing environment where the pasta fork will be used. Hospitals may desire a torque and speed combination at the lower end of the range. Maxon Precision Motors, Inc. is also a supplier of an exemplary gearing system.

Handle body 4 houses the drive components and battery in an elongated cavity. Stop system 12, drive shaft 15, gearing system 16, electric drive 18, power source 22 and charging mechanism 24 are all disposed inside of the handle body which may be made of plastic or metal. Free end 13 of the handle body can incorporate a male end that fits into a charging base (not shown). Handle body 4 may be constructed in various configurations, such as cylindrical or oval. The outer surface of the handle body may include a soft rubber, silicon feel or foam to provide a reliable grip for pasta fork 10. The handle body may also be ergonomically designed in other ways to facilitate handling and dining by the user. If desired, the handle body exterior may be tailored to a specific user.

Power source 22 may include a rechargeable battery or a conventional battery. In this arrangement, the free end 13 of the pasta fork includes a charging mechanism 22 having a pinned connection adapted to engage and contact an electrical power source on a charging base (not shown). The control circuitry may also include a controller configured to monitor capacity of the power source. Electrical current is transferred from the electrical power source to the charging mechanism 22 via a physical metal-to-metal contact of the pinned connection. Because pasta fork 10 will be in the charging base for an extended period of time, this charging arrangement avoids the replacement of conventional batteries, thus saving the user time, frustration and expense of replacing conventional batteries.

Alternatively, charging mechanism 22 could include an induced current charging arrangement. This arrangement is similar to electric toothbrushes that operate with induced current. This is advantageous because the system has improved water tightness. A charging base includes a female well for free end 13 of the handle body to be retained. The electrical coupling causes an induced current in charging mechanism 22 for providing induced current to the battery. The pasta fork in the induced charging arrangement can be retained in the charging base for extended periods of time after use. This allows the pasta fork 10 to be charged overnight or other times, thus saving the user the cost of replacing conventional batteries. U.S. Pat. No. 6,400,680 which discloses a system for charging batteries with induction current is herein incorporated by reference.

Figure 5:
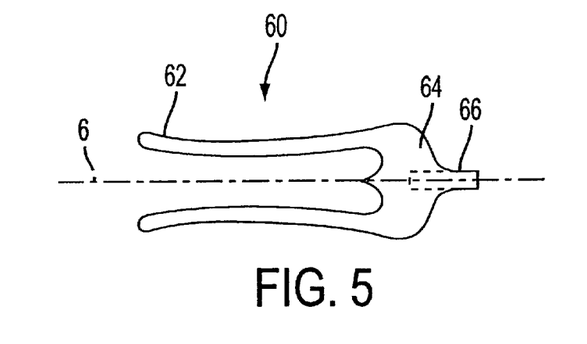
FIG. 5 is a plan view of an alternative embodiment of the inner rotating fork of the present invention.
Figures 7, 8:
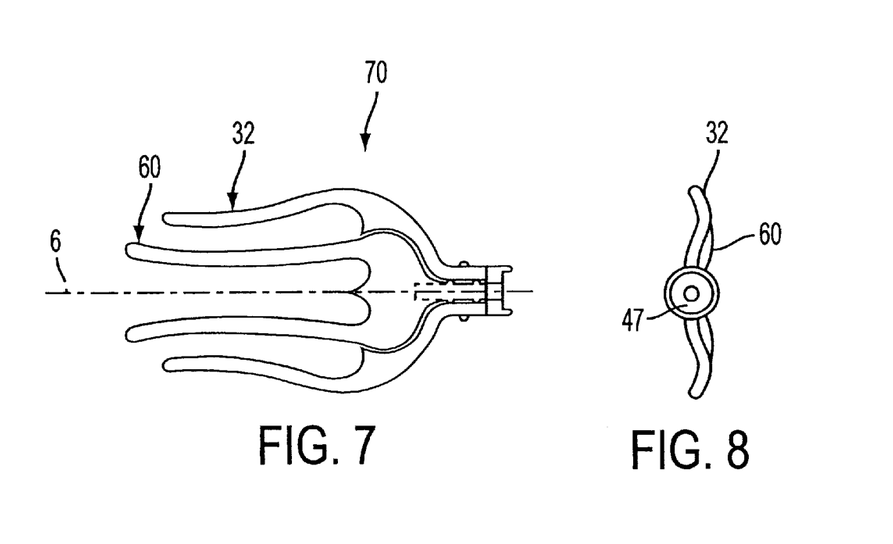
FIG. 7 is a plan view of an alternative embodiment of a fork assembly according to the present invention.
FIG. 8 is rear view of the fork assembly of the present invention of FIG. 7.

FIGS. 5, 7 and 8, illustrate an alternative embodiment of the fork assembly 70 having a two tine inner fork element 60. Referring to FIG. 5, inner fork element 60 is similar to fork element 36, except inner fork element 60 does not have a central tine. Nevertheless, inner fork element 60 has two laterally disposed tines 62 attached to a base portion 64. Base 64 is integrally attached to a coupling portion 66 that interconnects with the coupler shaft 51. FIG. 7 shows inner fork element 60 located inside of the outer fork element 32 in a similar manner as inner fork element 36. FIG. 8 shows a rear view of the fork assembly 70 where the outer fork element 32 has a valley depression for increased gathering of food product. The circular shape of the bearing cavity 47 can be better seen in FIG. 8. The numbers of tines of the inner fork element can range from two to six tines.

In an alternative embodiment of the fork assembly, the outer tines may rotate around the inner tines that remain stationary. In the stationary inner fork and rotating outer fork embodiment, the outer fork is operatively coupled to the electric drive. The outer fork element can have a toothed gear-like portion on an outer surface of the stem and the stem can be tubular having a hollow interior. An exemplary gearing system includes a drive gear, a motion transfer gear, and a third gear connected to the gear-like portion of the stem. An exemplary operational coupling to rotate the outer fork element is as follows. The shaft of electric drive 18 is connected to the drive gear to provide rotary motion. The drive gear meshes with the motion transfer gear so that the rotation of the drive gear is transferred thereto. Next, the transfer gear connects to the third gear via an elongated shaft. The third gear meshes with the gear-like portion on the stem of the outer fork element. In addition, the stem of the outer fork element can include a ball bearing device that provides the outer fork element to freely rotate within the tool end of the pasta fork. The ball bearing device may abut a mating groove portion in the inside surface of the tool end of the pasta fork of the present invention. The inner fork element includes an elongated shaft portion that travels through the stem and connects to a stationary portion of the handle body, such as an extension mounted to an inside surface thereof. Thus, the pasta fork of the present invention can have the outer fork element rotate around the inner fork element. This advantageously provides for having the pasta fork readily accumulate food product of different sizes.

Figure 9:
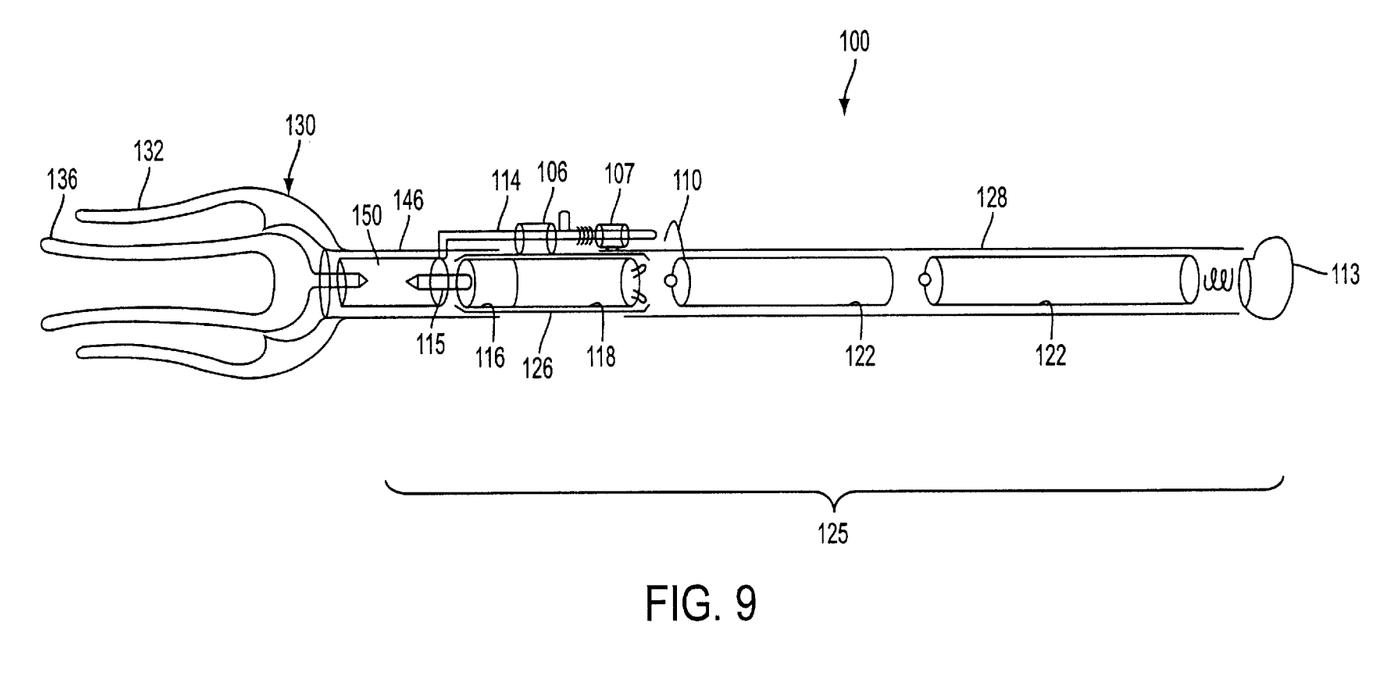
FIG. 9 is a schematic plan view of an alternative embodiment of the culinary device of the present invention shown with a top surface broken away.
Figure 10:
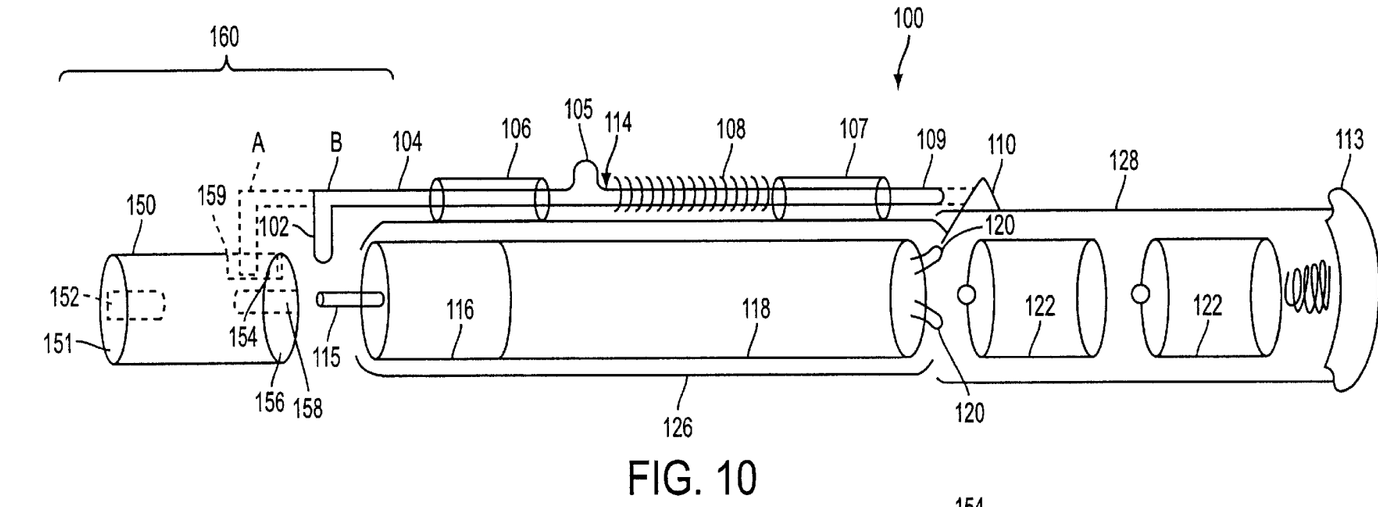
FIG. 10 is a partial schematic plan view of the culinary device of FIG. 9.

FIGS. 9–10 illustrate an alternative embodiment of a culinary device of the present invention. The culinary device is generally referred to herein as a pasta fork and designated by reference numeral 100. Pasta fork 100 of the present invention comprises two main components: a removable fork assembly 130, and a handle assembly 125. Each of these components is described in detail herein.

Fork assembly 130 comprises two main components: an outer fork part 132 and inner fork part 136. Outer fork part 132 is similar in structure and operation as outer fork element 32, except outer fork part 132 has an enlarged elongated stem formed in the shape of a hollow sleeve 146. Hollow sleeve 146 has a cylindrical structure and is removably mounted by a snap, a friction, or a threaded fit to a tool end of the pasta fork. Inner fork part 136 is located within the outer fork part and rotates about a central axis 8 of the pasta fork. Inner fork part 136 is removably connected to the pasta fork by a snap or friction fit to a rotatable coupler 150.

Handle assembly 125 comprises four components: a switch portion 114, a motor portion 126, an electric power portion 128, and a stop portion 160. Each of these components will be described in detail herein. As best shown in FIG. 10, switch portion 114 comprises a lock end 102 connected to an elongated shaft 104, a raised button portion 105, a helical tubular spring 108, and an electrical member 110. Lock end 102 engages locking portion 160 so that inner fork part 136 stops at a predetermined position after rotating. Elongated shaft 104 moves longitudinally towards the fork assembly and rearward towards a free end 113 of the pasta fork by sliding within two guide tubes 106, 107. Guide tubes 106, 107 are mounted to handle assembly 125 so that they are stationary with respect to shaft 104. Button portion 105 is disposed on shaft 104 so that a user can slide the shaft. Spring 108 is located on a part of shaft 104 between button portion 105 and guide tube 107. Spring 108 is designed so that a rearward motion of button portion 105 causes it to compress against guide tube 107. This is accomplished by adapting the diameter of spring 108 to match or mate with the outer periphery of tube 107. In addition, the length of spring 108 is sized such that it is compressed when lock end 102 is disengaged from the locking portion 160. Also, electric member 110 receives contact from shaft end 109 so as to control the rotation of inner fork part 136.

Motor portion 126 includes a gearing mechanism 116 operatively coupled to an electric drive 118. Gearing mechanism 116 is similar in construction and operation as gearing system 16 of pasta fork 10. Gearing mechanism 116 imparts rotary motion to a drive shaft 115. Electric drive 118 is similar in construction and operation as electric drive 18 of pasta fork 10. Electrical drive 118 provides rotary motion to gearing mechanism 116 and includes leads 120 operatively coupled to the circuitry control. Electric power portion 128 includes batteries 122. Nevertheless, electric power portion 128 is similar in construction and operation as power source 22 of pasta fork 10.

Figure 11:
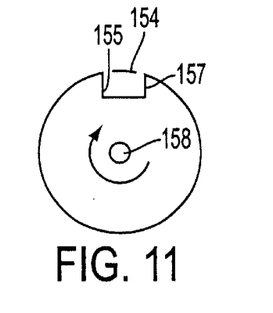
FIG. 11 is an end view of a coupler device of the present invention.

Referring to FIGS. 10 and 11, stop portion 160 comprises a coupler 150 having two opposing coupler ends 151, 156: end 151 includes a fork retaining portion 152, and end 156 includes a lock stop 154, and a drive shaft retaining portion 158. Coupler 150 is a cylindrical block, in which each end 151, 156 has a circular periphery. Fork retaining portion 152 includes a keyed depression located in the center of end 151 that is adapted to mate and hold inner fork part 136 during and after rotation. Stop portion 160 has a similar function and operation as stop mechanism 12 of pasta fork 10. Note that hollow sleeve 146 of the outer fork part fits around coupler 150 to mate with the tool end of the pasta fork. Hollow sleeve 146 includes an open slot adapted to the shape of lock stop 154.

FIG. 11 better illustrates the arrangement of coupler end 156. Drive shaft retaining portion 158 is similarly located in the center and is adapted to mate with drive shaft 115 of the gearing mechanism. Lock stop 154 includes a rectangular notch on an outer periphery of coupler 150 and coupler end 156. Lock stop 154 has opposing parallel sidewalls 155, 157 and a forward sidewall 159 mounted between and perpendicular to sidewalls 155, 157. Note that coupler end 156 has similar bearing surface as bearing surface 56 for low friction. The use of the bearing surface will be explained in the foregoing.

Referring to FIG. 10, lock stop 154 cooperates with lock end 102 of switch portion 114 so that lock end 102 can slide in and out thereof. Lock end 102 has at least two positions: a locked and an unlocked position. The locked position is shown by the dotted lines denoted as position A and the unlocked position is illustrated by the solid lines denoted as position B. In the locked position, lock end 102 is located within lock stop 154 and abuts sidewalls 155, 157 to prevent rotation of coupler 150 and inner fork part 136. While in the unlocked position, the lock end is located outside of the lock stop in which coupler 150 and inner fork part 136 freely rotate about axis 8. In the unlocked position, lock end 102 can abut and engage coupler end 156 when lock stop 154 is out of alignment with the lock end. When the lock end abuts the coupler end, spring 108 pushes lock end 102 against end 156. This is because the change in distance from position A and B causes button 105 to compress spring 102. The bearing surface on coupler end 156 helps reduce friction of the abutting lock end 102. Also, lock end 102 does not necessarily abut coupler end 156 when coupler 150 freely rotates. Note that lock end 102 slides within the slot of hollow sleeve 146.

Switch portion 114, stop portion 160, and motor portion 126 cooperative such that the inner fork part can start and terminate rotation. The following is a sequence of operation for starting and stopping inner fork part 136. To start the inner fork part, the user pushes button 105 towards the free end of the pasta fork. At this point, lock end 102 disengages lock stop 154 to free coupler 150 and inner fork part 136. Also the button motion causes shaft end 109 to contact electrical member 110 to simultaneously start the rotation of electric drive 118. The user keeps holding button 105 (or sets button 105 in place with a releasable lock), this maintains contact with electric member 110. This keeps rotating the inner fork part so as to gather a desired amount of food product. Note that the spring has stored energy from the compressed state. To stop the rotation of inner fork part 136, the user releases button 105. This releases some of the stored energy in spring 108, which causes lock end 102 to abut coupler end 156, and maintain shaft end 109 engaging electrical member 110. Next, as the electric drive 118 rotates coupler 150, lock end 102 glides on the bearing surface of coupler end 156. Then, lock end 102 and lock stop 154 eventually come into alignment. At the alignment point, lock end 102 enters lock stop 154 and almost simultaneously shaft end 109 releases contact with the electrical member. Thus, inner fork part 136 is stopped from rotating and is placed in the predetermined position in alignment with outer fork part 132.

It is appreciated that motor portion 126 and electric power portion 128 can have a modular construction. Motor portion 126 and electric power portion 128 can have an individual housing that form part of the handle assembly. These components may be physically coupled together by any appropriate method such as, threaded, friction, or snap fit. If desired, the motor portion and the electric portion can be in one housing.

Coupler 150 can be constructed of aluminum or the metals machined to the arrangement of the present invention. Alternatively, coupler 150 may be made from a moldable plastic material. Shaft 104 of switch portion 114 may be constructed of an appropriate metal or plastic material. In general lightweight materials provides for easy lifting and holding of the pasta fork.

Thus, a culinary device for consuming string-like food, such as pasta or noodles of some sort, in accordance with the present invention has been illustrated. A removable fork assembly of at least two parts accumulates food thereon, the two parts include an outer fork, and a rotating an inner fork. The culinary device includes a stop system or locking portion for stopping the rotation of inner fork after a predetermined number of revolutions and/or at a predetermined position. The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A hand held culinary device for collecting food, comprising:
    a handle body having a tool end and a free end and an interior compartment comprising:
        a power source,
        a motor connected to the power source,
        a gearing system cooperating with the motor;
    a switch coupled to activate the motor and mounted on the handle body; and
    a fork assembly coupled to the tool end of the handle body and comprising:
        a stationary fork member, and
        a rotatable fork member disposed proximate the stationary fork member adapted to rotate to collect food onto the fork assembly.

2. The culinary device of claim 1, wherein the rotatable fork member includes at least two laterally disposed tines.

3. The culinary device of claim 2, wherein the stationary fork member comprises at least two laterally disposed outer tines arranged such that rotatable fork member is disposed between the outer tines.

4. The culinary device of claim 2, wherein the stationary fork member comprises at least two laterally disposed inner tines arranged such that inner tines are disposed within the rotatable fork member.

5. The culinary device of claim 1, further comprising a stop system operatively coupled to the motor for terminating the rotation of the rotatable fork member.

6. The culinary device of claim 5, wherein the stop system terminates the rotation of the rotatable fork member after a predetermined number of revolutions.

7. The culinary device of claim 5, wherein the stop system terminates the rotation of the rotatable fork member at a predetermined position.

8. The culinary device of claim 7, further comprising a charging member for providing electric power to the power source.

9. The culinary device of claim 1, wherein the handle body includes a covering membrane.

10. The culinary device of claim 1, wherein the fork assembly is removable from the tool end of the handle body.

11. An eating utensil having a rotating fork at one end, said utensil comprising:
- a handle;
- an electric drive for providing rotary motion;
- a gearing system for engaging the electric drive;
- a fork cooperating with the gearing system for receiving rotary motion;
- a switch for actuating the electric drive; and
- a stop system configured to stop the rotary motion of the fork after a predetermined number of revolutions after actuation of the switch; wherein the fork includes an outer fork element that is stationary with respect to a rotatable inner fork element that receives rotary motion from the gearing system.

12. The eating utensil of claim 11, wherein the outer fork element includes at least two laterally disposed tines and the inner fork element is located between the two tines of the outer fork element.

13. An eating utensil having a rotating fork at one end, said utensil comprising:
- a handle;
- an electric drive for providing rotary motion;
- a gearing system for engaging the electric drive;
- a fork cooperating with the gearing system for receiving rotary motion;
- a switch for actuating the electric drive; and
- a stop system configured to stop the rotary motion of the fork after a predetermined number of revolutions after actuation of the switch; wherein the fork includes an inner fork member that is stationary with respect to a rotatable outer fork member that receives rotary motion from the gearing system.

14. The eating utensil of claim 11, wherein the stop system terminates the rotary motion of the fork at a predetermined position.

15. The eating utensil of claim 11, further comprising an induction current connector for recharging the power source by an induced current.

16. A pasta fork, comprising:
- a handle adapted to be held and manipulated by a user;
- a motor housed in the handle for imparting a rotational motion;
- a switch mounted on the handle for activating the motor; and
- a bi-planar fork assembly coupled to the handle and operatively coupled to the motor, wherein the fork assembly includes a stationary outer fork element defining a stationary plane and a rotatable inner fork element defining a rotating plane.

17. The pasta fork of claim 16, further comprising a gearing mechanism cooperating with the motor to transfer rotational motion to the rotatable inner fork element.

18. The pasta fork of claim 17, further comprising a stop system for stopping the rotatable inner fork element such that the rotatable plane rotates a predetermined number of times.

19. The pasta fork of claim 16, further comprising a stop system operatively coupled to the motor for stopping the rotatable inner fork element such that the rotatable plane is in a substantially coincident position with respect to the stationary plane.

20. A fork assembly for a culinary device, comprising:
- a rotatable outer fork part having laterally disposed tines; and
- an inner fork part having at least two inner tines, the inner fork part disposed within the tines of the outer fork part; wherein said outer fork part is adapted to rotate around the tines of the inner fork part and said inner fork part being stationary with respect to the rotatable outer fork part.

* * * * *

UNITED STATES PATENT AND TRADEMARK OFFICE
CERTIFICATE OF CORRECTION

PATENT NO. : 6,442,846 B1
DATED : September 3, 2002
INVENTOR(S) : Michael Maiello It is certified that error appears in the above-identified patent and that said Letters Patent is hereby corrected as shown below:

<u>Title page,</u>
Item [76], Inventor, "Maiello Michael" has been replaced with -- Michael Maiello --.

Signed and Sealed this

Twenty-seventh Day of May, 2003

JAMES E. ROGAN
*Director of the United States Patent and Trademark Office*